United States Patent
Chaudry et al.

(10) Patent No.: US 10,598,407 B2
(45) Date of Patent: Mar. 24, 2020

(54) GAS POWERED WATER HEATER CONTROLLER AND RELATED METHODS

(71) Applicant: Emerson Electric Co., St. Louis, MO (US)

(72) Inventors: Saad A. Chaudry, St. Louis, MO (US); Donald L. Blessing, Manchester, MO (US); Juan G. Renteria, El Paso, TX (US)

(73) Assignee: Emerson Electric Co., St. Louis, MO (US)

( * ) Notice: Subject to any disclaimer, the term of this patent is extended or adjusted under 35 U.S.C. 154(b) by 174 days.

(21) Appl. No.: 15/803,090

(22) Filed: Nov. 3, 2017

(65) Prior Publication Data

US 2019/0137141 A1    May 9, 2019

(51) Int. Cl.
| | |
|---|---|
| *F16K 17/10* | (2006.01) |
| *F23N 1/00* | (2006.01) |
| *F24H 9/20* | (2006.01) |
| *F16K 31/08* | (2006.01) |
| *F24H 1/18* | (2006.01) |

(52) U.S. Cl.
CPC ......... *F24H 9/2035* (2013.01); *F16K 31/082* (2013.01); *F24H 1/181* (2013.01); *F24H 9/2021* (2013.01); *F23K 2900/05001* (2013.01); *F23N 2229/02* (2020.01); *F23N 2235/14* (2020.01); *F23N 2237/02* (2020.01); *F23N 2241/04* (2020.01)

(58) Field of Classification Search
CPC ........ F24H 9/2035; F24H 1/205; F23N 1/002; F23D 14/02; F23D 23/00; F16K 17/10; F16K 11/22; F16K 31/365; F16K 17/18; F16K 31/126
See application file for complete search history.

(56) References Cited

U.S. PATENT DOCUMENTS 2,688,569 A    9/1954  Malone et al.
2,717,381 A *  9/1955  Matthews ................... 236/21 R
(Continued)

FOREIGN PATENT DOCUMENTS

WO    2016032469 A1    3/2016

OTHER PUBLICATIONS

Service Manual for Bradford White Defender Safety System® Models, Flammable Vapor Ignition Resistant Water Heaters, Manual 238-44943-00D (40 pgs.).
(Continued)

*Primary Examiner* — Gregory A Wilson
(74) *Attorney, Agent, or Firm* — Armstrong Teasdale LLP

(57) ABSTRACT

A gas flow controller for use with a gas powered water heater includes a first gas flow valve, and a first gas flow valve actuator assembly connected to the first gas flow valve and configured to hold the first gas flow valve in an open position. The first gas flow valve actuator assembly includes a first electromagnetic actuator, a corrosion resistant material encapsulating the first electromagnetic actuator, a first wire lead connected to the first electromagnetic actuator at a first solder joint, a corrosion resistant material encapsulating the first solder joint, a second wire lead connected to the first electromagnetic actuator at a second solder joint, and a corrosion resistant material encapsulating the second solder joint.

18 Claims, 12 Drawing Sheets

(56) References Cited

U.S. PATENT DOCUMENTS

| | | | | |
|---|---|---|---|---|
| 3,263,196 | A * | 7/1966 | Reber | H01F 27/327 |
| | | | | 336/96 |
| 3,447,746 | A * | 6/1969 | Visos | F23N 1/087 |
| | | | | 236/21 B |
| 3,643,194 | A | 2/1972 | Atherton | |
| 5,538,220 | A | 7/1996 | LaMarca | |
| 6,820,856 | B2 * | 11/2004 | Grill | F16K 31/05 |
| | | | | 251/129.05 |
| 6,864,772 | B2 * | 3/2005 | Callis | H01F 7/128 |
| | | | | 335/260 |
| 8,382,065 | B2 * | 2/2013 | Hendrickson | F25D 29/00 |
| | | | | 141/347 |
| 9,390,875 | B2 * | 7/2016 | Kohlhafer | H01H 50/20 |
| 9,410,719 | B2 | 8/2016 | Furmanek et al. | |
| 9,568,196 | B2 | 2/2017 | Furmanek et al. | |
| 9,574,793 | B2 | 2/2017 | Furmanek et al. | |
| 9,599,369 | B2 | 3/2017 | Furmanek et al. | |
| 9,923,442 | B2 * | 3/2018 | Chalvignac | H01F 7/066 |
| 2013/0027833 | A1 * | 1/2013 | Rabe | H01F 7/1646 |
| | | | | 361/206 |
| 2016/0334139 | A1 | 11/2016 | Bronson | |

OTHER PUBLICATIONS

Service Manual for Bradford White TTW® Series Through-The-Wall Gas Water Heaters, Manual 45960A, from website http://waterheatertimer.org/How-to-install-gas-water-heater.html#troubleshoot (36 pgs.).

Service Manual for Honeywell WT8840 Trade Water Heater Controls, 34-00013EF (20 pgs).

Honeywell icon gas valve on Bradford White tank malfunctioning after 2 years, from website http://www.hot-water-heaters-reviews.com/honeywell-icon-gas-valve-on-bradford-white-t . . . (2 pgs.).

* cited by examiner

GAS POWERED WATER HEATER CONTROLLER AND RELATED METHODS

FIELD

The field relates generally to gas powered water heaters, and more particularly, to gas flow controllers including encapsulated, corrosion resistant, electromagnetic actuators.

BACKGROUND

Gas flow controllers are commonly incorporated in gas powered water heaters to control a flow of combustible gas to one or more gas burners, such as a pilot burner and a main burner. To control the flow of gas, and in some gas flow controllers, a gas flow valve may be connected to a gas flow valve actuator assembly that is arranged to open the gas flow valve. Specifically, some gas flow valve actuator assemblies include an exposed electromagnetic actuator, such as an exposed solenoid, which may function, in conjunction with one or more other components, to open the gas flow valve.

During operation, these gas flow valve actuator assemblies may be directly exposed to the gas stream. Due to the use of fracked gas, relatively new contaminants may be entrained in the gas flow such as water, oxygen, carbon dioxide, hydrogen sulfide, chlorides, microorganisms capable of attaching to the actuator windings, and the like. Applicants have found that contaminants found in fracked gas may corrode the actuator assemblies, ultimately resulting in shorted or open gas flow valve actuator assemblies. Additionally, some traditional methods of protecting such assemblies may result in heat retention, which can also lead to problems with the assemblies. Current methods of manufacturing actuator assemblies also require significant manual labor, adding cost to the assembly. Accordingly, a cost effective actuator assembly able to withstand such contamination, while still reliably and repeatedly performing the necessary functions of such an actuator, is needed.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a gas powered water heater includes a first gas flow valve, a pilot burner arranged to receive a flow of combustible gas from the first gas flow valve, and a first gas flow valve actuator assembly connected to the first gas flow valve and configured to hold the first gas flow valve in an open position upon completion of an ignition sequence. The first gas flow valve actuator assembly includes a first electromagnetic actuator encapsulated by a corrosion resistant material, a first wire lead connected to the first electromagnetic actuator and encapsulated by a corrosion resistant material, and a second wire lead connected to the first electromagnetic actuator and encapsulated by a corrosion resistant material. The gas powered water heater also includes a second gas flow valve, a main burner arranged to receive a flow of combustible gas from the second gas flow valve, and a second gas flow valve actuator assembly connected to the second gas flow valve and configured to open and close the second gas flow valve in response to a call for heat. The second gas flow valve actuator assembly includes a second electromagnetic actuator encapsulated by a corrosion resistant material, a first wire lead connected to the second electromagnetic actuator and encapsulated by a corrosion resistant material, and a second wire lead connected to the second electromagnetic actuator and encapsulated by a corrosion resistant material.

In another aspect, a gas flow controller for use with a gas powered water heater includes a first gas flow valve, and a first gas flow valve actuator assembly mechanically connected to the first gas flow valve and configured to hold the first gas flow valve in an open position. The first gas flow valve actuator assembly includes a first electromagnetic actuator, a corrosion resistant material encapsulating the first electromagnetic actuator, a first wire lead electrically connected to the first electromagnetic actuator at a first solder joint, a corrosion resistant material encapsulating the first solder joint, a second wire lead electrically connected to the first electromagnetic actuator at a second solder joint, and a corrosion resistant material encapsulating the second solder joint.

In yet another aspect, a gas flow valve actuator assembly for use with a gas powered water heater includes an electromagnetic actuator, a corrosion resistant material encapsulating at least a portion of the electromagnetic actuator, and a first wire lead electrically connected to the electromagnetic actuator at a first solder joint. A corrosion resistant material encapsulates at least a portion of the first solder joint, a second wire lead is electrically connected to the electromagnetic actuator at a second solder joint, and a corrosion resistant material encapsulates at least a portion of the second solder joint.

In yet another aspect, a method of manufacturing an electromagnetic actuator for use with a gas flow controller includes providing a bobbin having a first flange, a second flange, and a body extending between. The body includes an inner surface and an outer surface, the inner surface defining an elongated cavity. The method also includes winding an electrically conductive wire around the outer surface of the bobbin to form a coil on the bobbin, applying a corrosion resistant material over the coil, such that the coil is encapsulated, between the first flange and the second flange, by the corrosion resistant material, and positioning an electrically conductive core element at least partially within the elongated cavity of the bobbin.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

Figure 1:
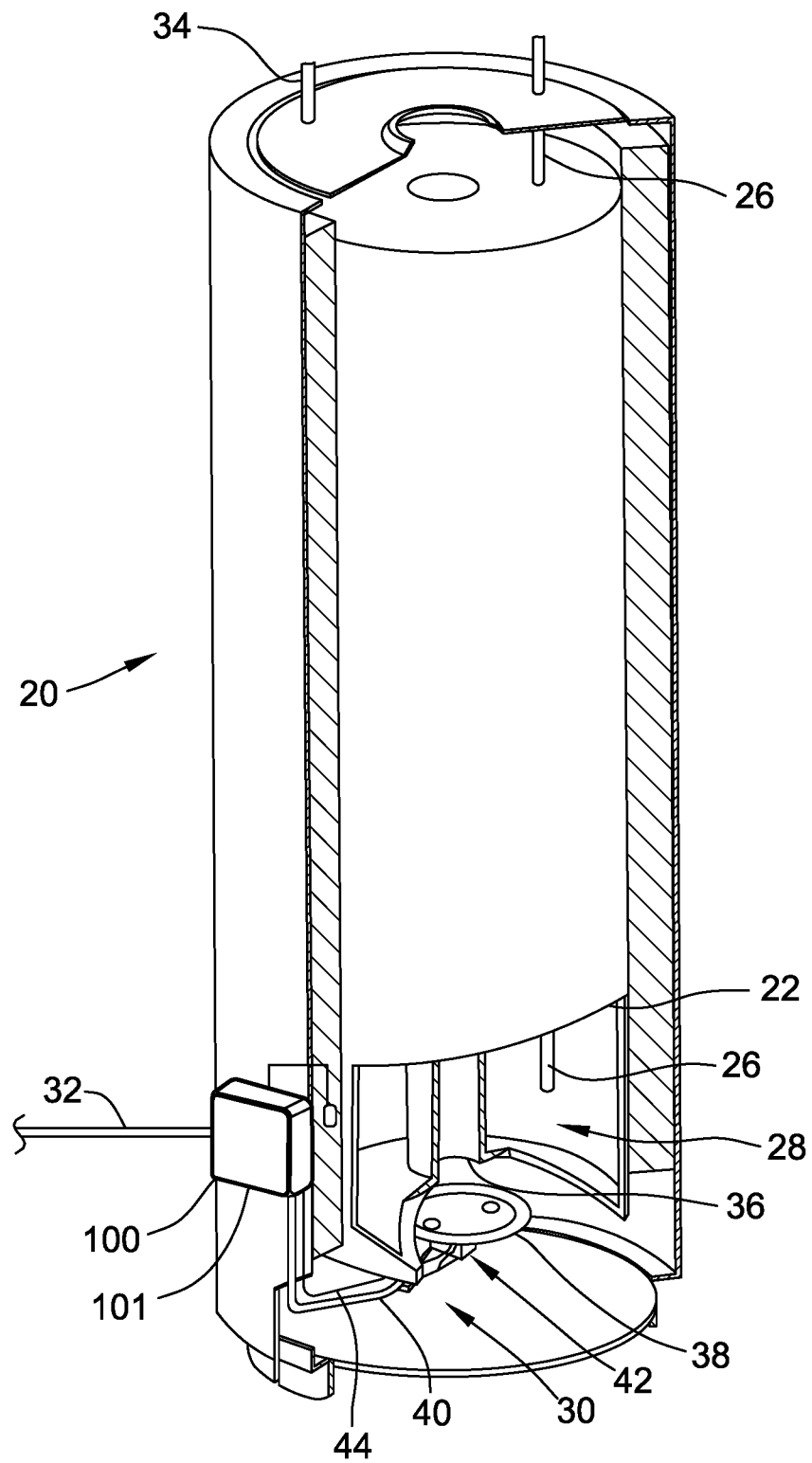
FIG. 1 is a perspective cut-away of an example gas powered water heater including a gas flow controller for controlling a flow of combustible gas to the water heater.

FIG. 1 is a cut-away view of an example gas powered water heater 20 incorporating a gas flow controller 100 as described in detail below. Gas flow controllers consistent with this disclosure may be used with other types of water heaters. As shown, gas powered water heater 20 generally includes a storage tank 22, a gas powered burner assembly 30 positioned beneath storage tank 22 for heating water supplied to and stored in storage tank 22, and a gas flow controller 100 for controlling the supply of gas to main burner assembly 30.

In operation, storage tank 22 receives cold water via a cold water inlet 26 disposed within a bottom portion 28 of storage tank 22. Cold water entering bottom portion 28 of storage tank 22 is heated by burner assembly 30 and is dispensed via a hot water outlet pipe 34. Combustion gases from burner assembly 30 are vented from the water heater system 20 via flue 36. Gas flow controller 100 includes a cover or housing 101 and is connected to a main gas supply line 32, and is arranged to control the supply of gas from main gas supply line 32 to burner assembly 30, as described below.

Burner assembly 30 includes a main burner 38 connected to gas flow controller 100 via a gas supply line 40 and a pilot burner 42 for igniting main burner 38. Specifically, and as described in greater detail below, pilot burner 42 is ignited to provide a pilot flame, which is used to ignite main burner 38.

Figure 2A:
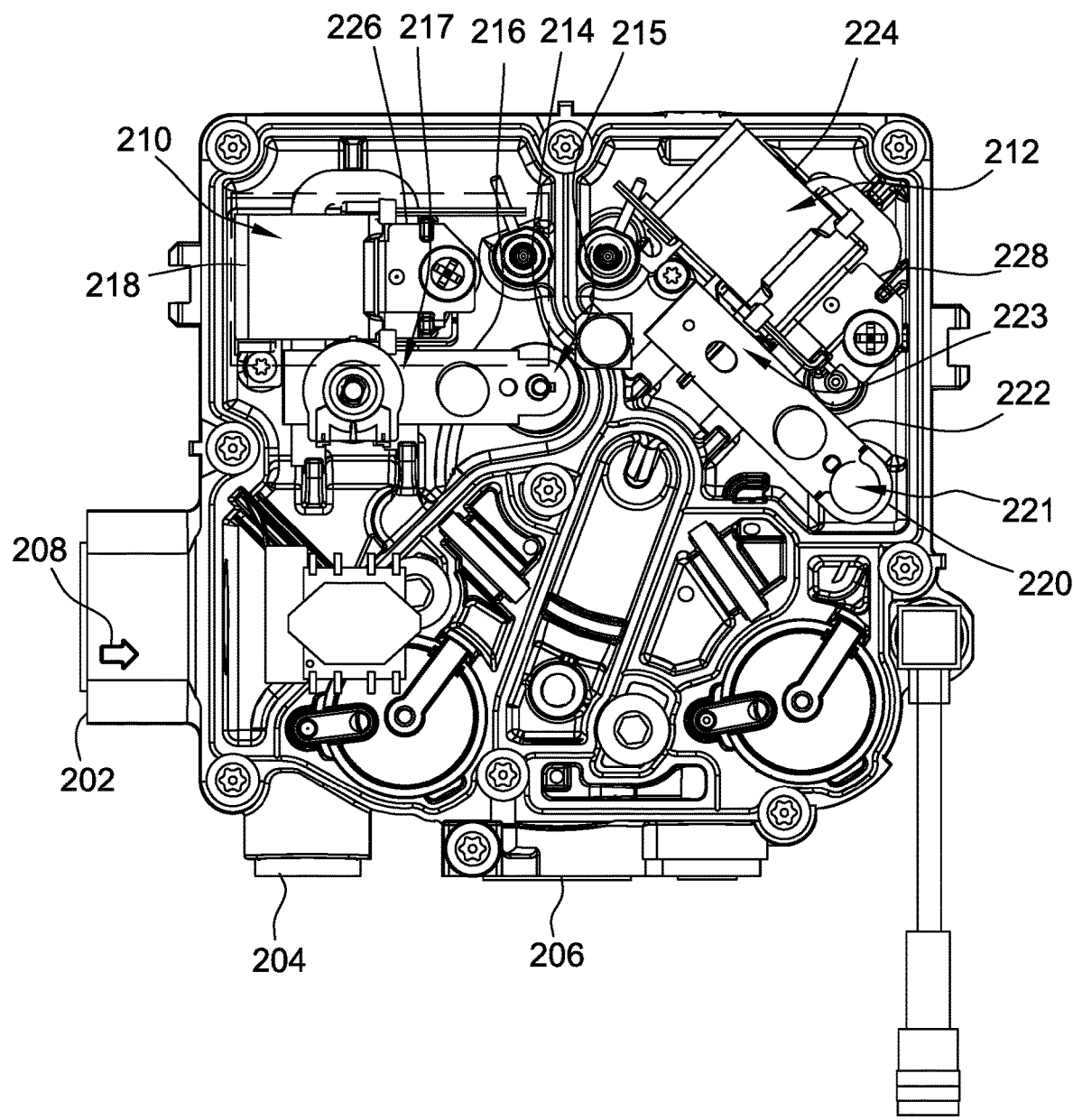
FIG. 2A is a top view of the gas flow controller with the housing omitted.
Figure 2B:
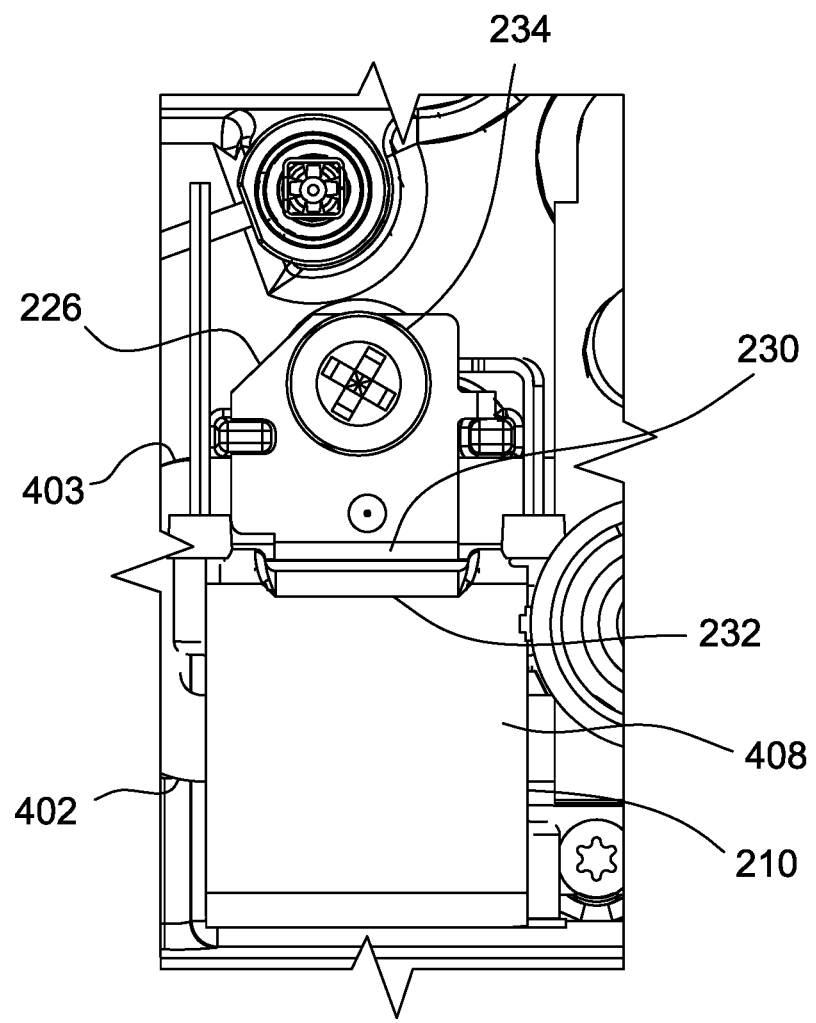
FIG. 2B is an enlargement of a portion of the gas flow controller show in FIG. 2A.

FIG. 2A is a top view of gas flow controller 100 in which a portion of housing 101 is removed (shown in FIG. 1). In general, gas flow controller 100 includes a gas inlet 202, a pilot burner outlet 204, and a main burner outlet 206.

Gas flow controller 100 also includes a first gas flow valve actuator assembly 210 and a second gas flow valve actuator assembly 212. First gas flow valve actuator assembly 210 is operable to hold a first gas flow valve 214 (also referred to as a "first valve" or "pilot valve") in an open position, such as against a biasing or spring force exerted on first valve 214 by a first valve spring. Second gas flow valve actuator assembly 212 is operable to move a second gas flow valve 220 (also referred to as a "second valve" or "main valve") to an open position, such as against a biasing or spring force exerted on second valve 220 by a second valve spring.

In this embodiment, first gas flow valve actuator assembly 210 includes a first armature 216 and a first electromagnetic actuator 218. First valve 214 is mechanically connected to first armature 216, such as at a first end 215 of first armature 216. In addition, and as described in greater detail below, first armature 216 may be electromagnetically connected, such as at a second end 217, to first electromagnetic actuator 218.

In operation, first valve 214 is manually actuated by a user during an ignition sequence. For example, the user may hold a control mechanism down (e.g., a control knob) on gas flow controller 100 to move first valve 214 into an open position. In the open position, first valve 214 distributes a flow of combustible gas 208 to pilot burner 42. Specifically, flow of combustible gas 208 is received at gas inlet 202 from main gas supply line 32 and provided, through pilot burner outlet 204, to pilot burner 42. In addition, as first valve 214 is held in the open position, pilot burner 42 is ignited (e.g., by any suitable ignition source, such as a piezo-igniter) to generate a pilot flame. A thermoelectric device (such as a thermopile or a thermo-generator) disposed in proximity to pilot burner 42 generates, as a result of being heated by the pilot flame, an electrical current.

The electrical current generated by the thermoelectric device is provided to first gas flow valve actuator assembly 210, which maintains first valve 214 in the open position in the presence of the electrical current. Specifically, the electrical current is provided to and flows through first electromagnetic actuator 218. In response, first electromagnetic actuator 218 generates an electromagnetic field that holds first end 215 of first armature 216 against first electromagnetic actuator 218, thereby holding first valve 214 in the open position without assistance from the user. Once first gas flow valve actuator assembly 210 is functioning to hold first valve 214 in the open position (e.g., on completion of the ignition sequence initiated by the user), the user may release the control mechanism without extinguishing the pilot flame.

Second gas flow valve actuator assembly 212 includes a second armature 222 and a second electromagnetic actuator 224. Second valve 220 is mechanically connected to second armature 222, such as at a first end 221 of second armature 222. In addition, and as described in greater detail below, second armature 222 may be electromagnetically connected, such as at a second end 223, to second electromagnetic actuator 224.

In operation, second electromagnetic actuator 224 generates an electromagnetic field that pulls second end 223 of second armature 222 towards second electromagnetic actuator 224. As second end 223 of second armature 222 is drawn towards second electromagnetic actuator 224, first end 221 of second armature 222 is raised, such that second valve 220 is pulled by second armature 222 into an open position (in opposition to the spring force described above).

More particularly, and in the example embodiment, second electromagnetic actuator 224 is energized in response to a call for heat received or initiated by a microcontroller of gas flow controller 100. The call for heat may be generated as a function of a sensed temperature within storage tank 22 of water heater 20 measured against a desired temperature manually input to gas flow controller 100 by a user. For example, a user may manipulate a temperature control knob disposed on gas flow controller 100, which may adjust or vary an output voltage of a potentiometer coupled to the control knob. In other words, the user may adjust the control knob to adjust an output voltage of the potentiometer, which may correspond to a desired temperature setting. A microcontroller of gas flow controller 100 may compare the desired temperature setting to an actual temperature of water stored in water heater 20, and if the actual water temperature is less than the desired temperature setting, the microcontroller may cause second electromagnetic actuator 224 to be energized, which may, as described above, open second valve 220 to provide combustible flow of gas 208 to main burner 38 (thereby heating bottom portion 28 of storage tank 22 of water heater 20).

Gas flow controller 100 thus functions to control and direct flow of combustible gas 208 to pilot burner 42 and/or main burner 38, depending, for example, upon whether pilot burner 42 is ignited and/or in response to a call for heat, such as a call for heat initiated by a microcontroller of gas flow controller 100. More particularly, first gas flow valve actuator assembly 210 and second gas flow valve actuator assembly 212 are operable to direct flow of combustible gas 208 within gas flow controller 100, such that one or both of pilot burner 42 and/or main burner 38 receive flow of combustible gas 208.

Gas flow controller 100 may also include a variety of other structures, such as gas flow paths, chambers, valves, and the like arranged to guide flow of combustible gas 208 within gas flow controller 100. A more detailed description of a gas flow controller similar to gas flow controller 100 is found in U.S. Pat. No. 9,618,205, filed May 13, 2014, which is incorporated herein by reference in its entirety.

Figure 3:
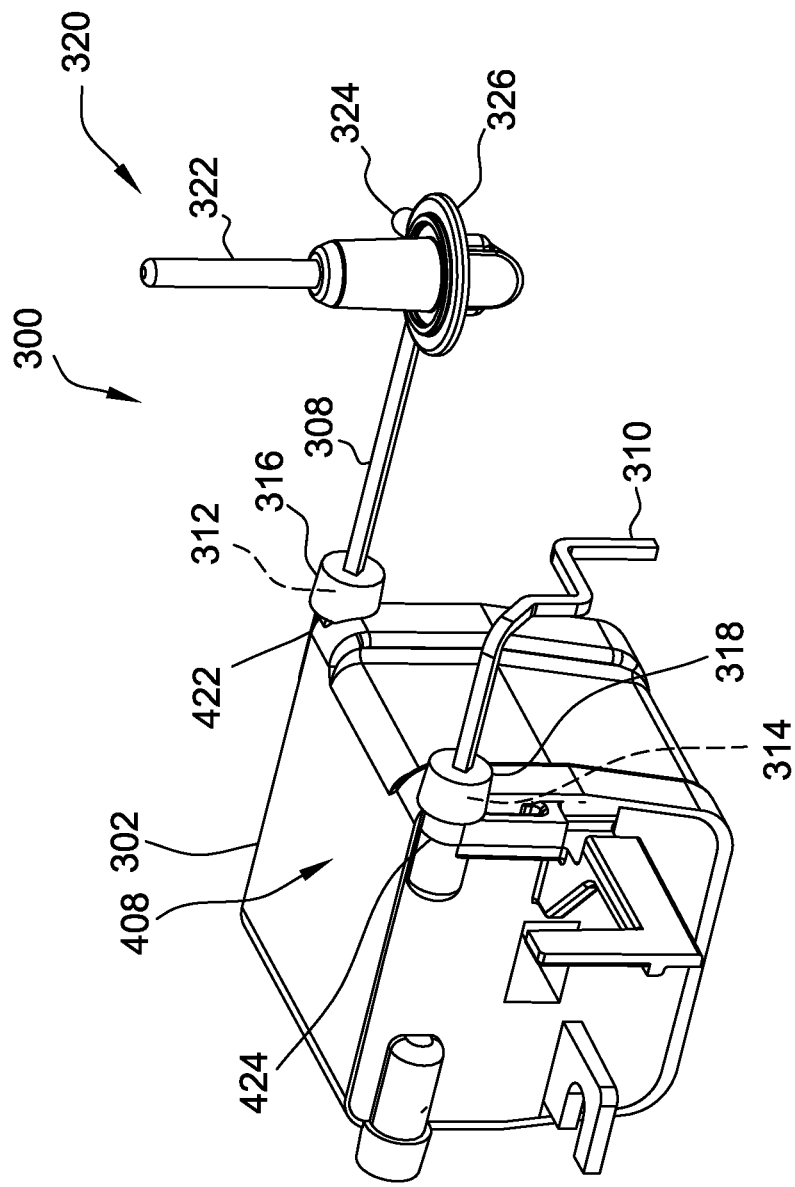
FIG. 3 is a perspective of a gas flow valve actuator assembly of the gas flow controller shown in FIG. 2A.
Figure 4A:
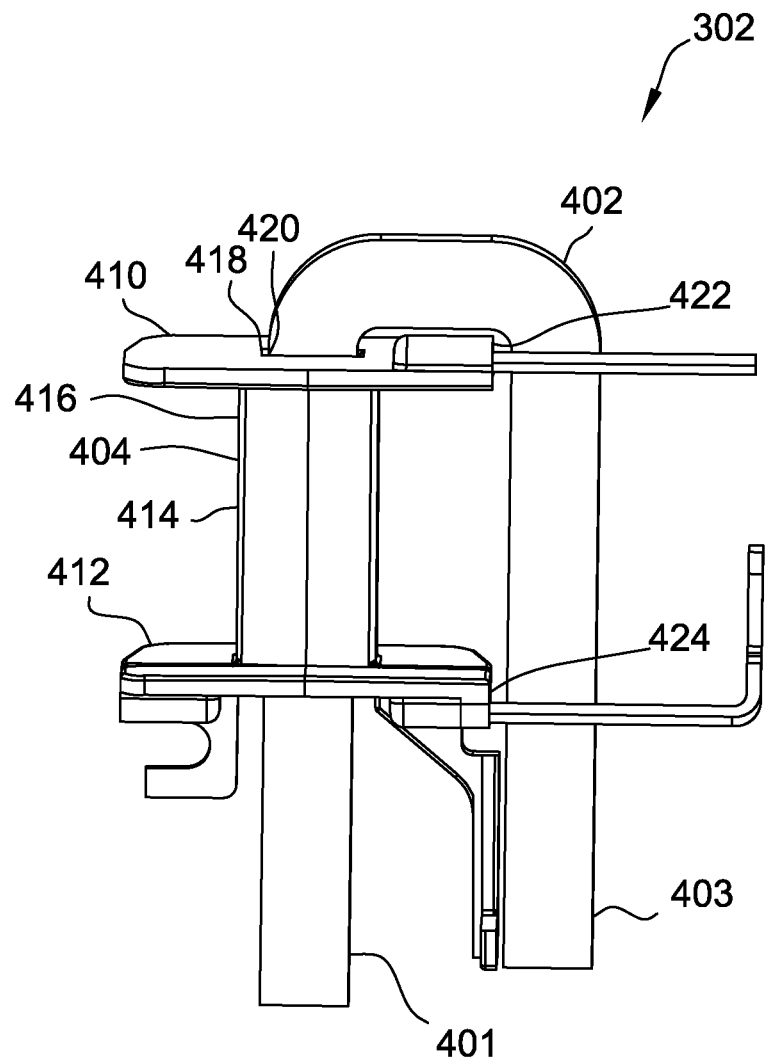
FIG. 4A is a perspective of an example bobbin of the actuator shown in FIG. 3.
Figure 4B:
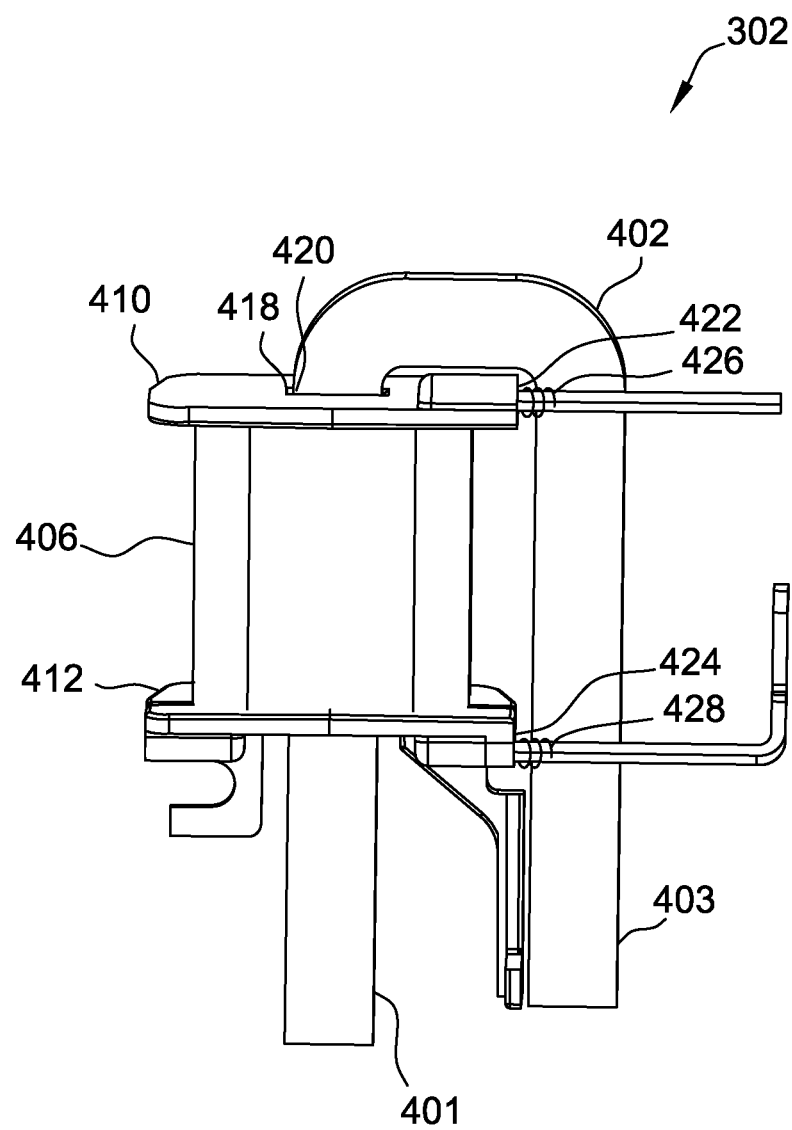
FIG. 4B is a perspective of an example bobbin and coil of the electromagnetic actuator shown in FIG. 3.
Figure 4C:
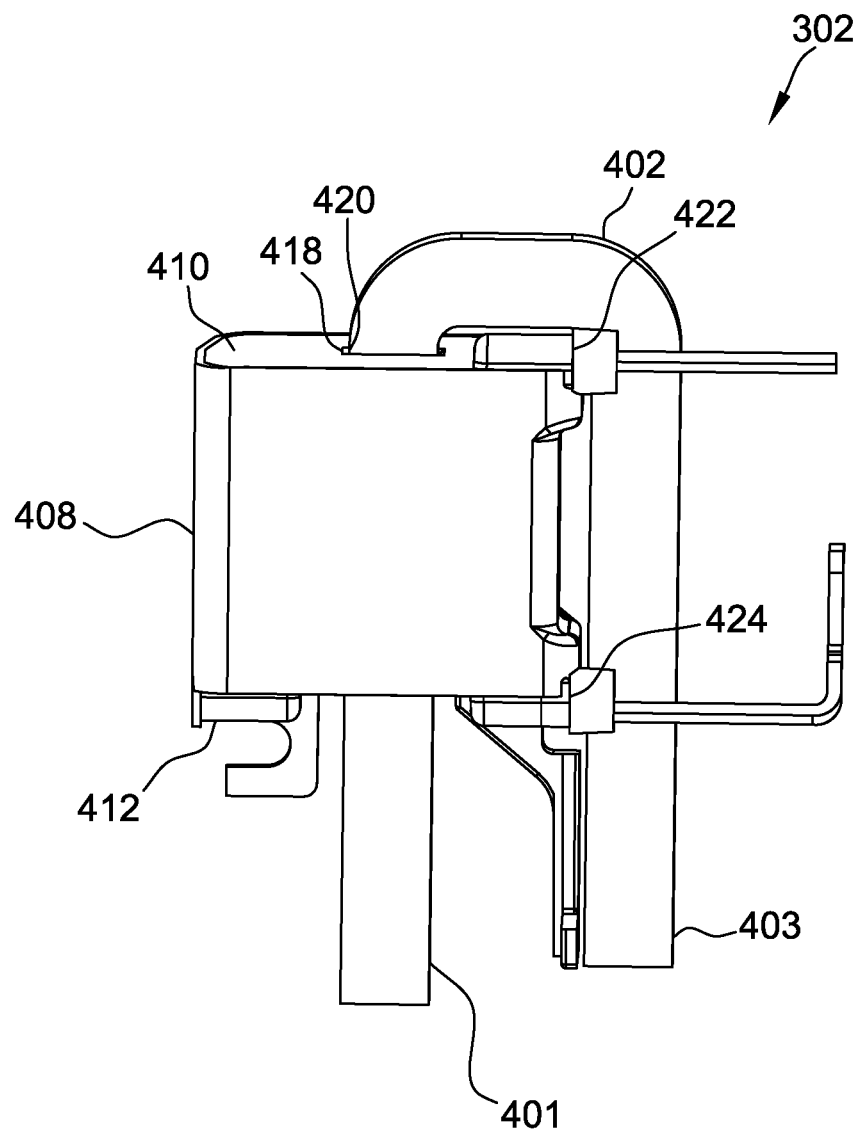
FIG. 4C is a perspective of an example bobbin and encapsulated coil.

FIG. 3 is a perspective view of an example gas flow valve actuator assembly 300, usable for either or both of first gas flow valve actuator assembly 210 and/or second gas flow valve actuator assembly 212. Gas flow valve actuator assembly 300 includes encapsulated electromagnetic actuator 302. Detailed views of electromagnetic actuator 302 are shown at FIGS. 4A, 4B, and 4C. Electromagnetic actuator 302 is a solenoid that includes a u-shaped core element 402 (or "yoke"), a bobbin 404 that supports and encloses a portion of core element 402, an electrically conductive winding or coil 406 that is wrapped about bobbin 404, and an encapsulation 408 made of corrosion resistant material that encapsulates, covers and protects at least a portion of core element 402 and/or coil 406.

Core element 402 is a u-shaped bar, e.g., of iron or steel, having a first leg 401 and a second leg 403 that extends substantially parallel to first leg 401. However, in other embodiments, core element 402 may include any suitable shape (e.g., a c-shape) and may be formed from any suitable electrically conductive material.

Bobbin 404 includes a first flange 410, a second flange 412, and a hollow tubular body 414 extending therebetween. Body 414 includes an exterior surface 416 and an interior surface 418, where interior surface 418 functions to define an elongated cavity 420 through which first leg 401 of core element 402 may be inserted and within which first leg 401 may be positioned and secured. First flange 410 may include a first pass through 422, and second flange 412 may include a second pass through 424, both of which may function as described in detail below. Bobbin 404 may be formed from any suitable material, such as an electrically insulating material (e.g., plastic).

Coil 406 may be made of any suitable electrically conductive length of wire, such as a length of copper wire, and includes a first end 426 and a second end 428. During assembly, coil 406 is wound about exterior surface 416 of body 414. In addition, in at least some embodiments, first end 426 may be inserted through first pass through 422 of first flange 410. Likewise, second end 428 may be inserted through second pass through 424 of second flange 412.

Encapsulation 408 is bonded or connected over coil 406 and arranged to seal, protect and inhibit contamination of coil 406, especially from contact with the flow of combustible gas 208. To this end, encapsulation 408 may comprise or include a variety of suitable corrosion resistant materials, such as, for example, and without limitation, plastic materials, corrosion resistant metals or metal alloys, corrosion resistant rubbers, corrosion resistant polymers, such as polytetrafluoroethylene ("PTFE"), elastic synthetic polymers, such as nylon, one or more corrosion resistant coatings, such as any suitable adhesive, and the like. In some embodiments, encapsulation 408 is an overmold, such as a plastic or nylon overmold, bonded over at least a portion of coil 406, such as, for example, over coil 406 between first flange 410 and second flange 412. In other embodiments, encapsulation 408 is an overmold bonded over coil. 406 as well as flanges 410 and 412. In yet another embodiment, encapsulation 408 may include a protective overwrap, such as an adhesive vinyl or nylon overwrap manufactured from a material that is resistant to corrosion in the presence of flow of combustible gas 208. The corrosion resistant coatings described herein may include any suitable low viscosity, fluorescing, visible light curing adhesive, such as LOCTITE® 3554 and/or LOCTITE® 3555.

In some embodiments, encapsulation 408 includes a material that is sufficiently thermally conductive to allow dissipation of sufficient heat generated during operation. For example, encapsulation 408 may be rated to withstand temperatures of approximately 130 degrees Celsius (corresponding to the maximum operating temperature for a class B coil). However, in other embodiments, encapsulation may be rated to withstand higher temperatures (e.g., temperatures exceeding 130 degrees Celsius) and/or lower temperatures, such as temperatures in the range of 90 degrees to 130 degrees Celsius.

One factor that may affect a temperature rating of encapsulation 408 is a cross-sectional area of coil 406. Specifically, as the cross-sectional area of coil 406 is altered, the heat generated during operation of coil 406 may increase and/or decrease. In some embodiments, the cross-sectional area of coil 406 may be selected to be as small as possible (to accommodate various space and/or power usage or dissipation constraints), which may result in oxidation of coil 406 if coil 406 is not encapsulated, such as, for example, by contact with hydrogen sulfide and other contaminants entrained in flow of combustible gas 208. As coil 406 oxidizes in the presence of such contaminants, the cross-sectional area of coil 406 may be diminished or reduced, over time, such that coil 406 generates a weaker electromagnetic field, resulting, for example, in impairment and/or failure of gas flow controller 100. Thus, in the example embodiment, coil 406 is protected by encapsulation 408 from corrosion by contact with contaminants entrained in flow of combustible gas 208.

With reference now to FIGS. 2A and 28, gas flow controller 100 may also include a first mounting bracket 226 and a second mounting bracket 228. First mounting bracket 226 may abut first electromagnetic actuator 218 and may function to position and secure first electromagnetic actuator 218 within gas flow controller 100. Likewise, second mounting bracket 228 may abut second electromagnetic actuator 224 and may function to position and secure second electromagnetic actuator 224 within gas flow controller 100.

In this embodiment, first mounting bracket 226 and second mounting bracket 228 are identical, however, their orientations may differ. As a result, although the following description relates to first mounting bracket 226, it will be appreciated that the same description is applicable to second mounting bracket 228. First mounting bracket 226 includes a ridge 230 configured to engage a receiver 232 formed in first electromagnetic actuator 218. Specifically, receiver 232 may be formed within encapsulation 408 of first electromagnetic actuator 218. First mounting bracket 226 may also be arranged to cover and secure a portion of second leg 403 of core element 402 with gas flow controller 100.

During assembly, receiver 232 of first electromagnetic actuator 218 may be aligned with ridge 230, such that ridge 230 engages within receiver 232 to position and secure first electromagnetic actuator 218 within gas flow controller 100. In addition, first mounting bracket 226 may be placed over a portion of core element 402, such as over second leg 403 of core element 402, such that core element 402 is also positioned and secured within gas flow controller 100. In the example embodiment, first mounting bracket 226 includes a clearance hole arranged to receive a fastener 234, such as a bolt or screw, which is inserted through first mounting bracket 226 to secure first mounting bracket 226 within gas flow controller 100.

In operation, and with reference now to FIGS. 2A, 2B, 3, and 4A-4C, an electrical current may be supplied to coil 406, such as at first end 426 of coil 406. As electrical current flows in coil 406, an electromagnetic actuator, such as either or both of electromagnetic actuators 218 and/or 224, may generate an electromagnetic field. In the presence of the electromagnetic field, an armature (e.g., first armature 216 and/or second armature 222) is pulled towards (or held against, in the case of first armature 216) a respective electromagnetic actuator 218 and/or 224. As armatures 216 and/or 222 are drawn or held towards a respective actuator 218 and/or 224, armatures 216 and/or 222 apply a mechanical force on a respective valve 214 and/or 220 to open (or hold open) the valve 214 and/or 220 (e.g., against a spring force, as described above). Thus, each electromagnetic actuator is operable to generate an electromagnetic field that, in conjunction with a mechanical coupling between a respective armature and valve, causes the armature to pull the valve into an open position and/or hold the valve open.

With reference to FIGS. 3 and 4A-4C, electromagnetic actuator 302 also includes a first wire lead 308 and a second wire lead 310. In some cases, first wire lead 308 is a square wire and is electrically connected at a first location, such as a first solder joint 312, to first end 426 of coil 406. Specifically, first wire lead 308 is inserted through first pass through 422, and first end 426 of coil 406 is wrapped around a portion of first wire lead 308 and soldered.

Similarly, second wire lead 310, which may also be a square wire, is electrically connected at a second location, such as a solder joint 314, to second end 428 of coil 406. Specifically, second wire lead 310 is inserted through second pass through 424, and second end 428 of coil 406 is wrapped around a portion of second wire lead 310 and soldered. In some embodiments, first wire lead 308 and/or second wire lead 310 may include another suitable shape, such as, for example, a rounded shape (e.g., a shape circular in cross section). Further, in one example embodiment, first wire lead 308 and second wire lead 310 are a tin plated brass alloy; however, any suitable composition of conductive metal may be used in the fabrication of first wire lead 308 and second wire lead 310. For example, a material of first wire lead 308 and/or second wire lead 310 may be chosen for conductivity characteristics and/or corrosion resistance characteristics.

Like electromagnetic actuator 302, at least a portion of first wire lead 308 and/or at least a portion of second wire lead 310 may be encapsulated by a corrosion resistant material, such as any of the corrosion resistant materials described above and/or by an insulating sheath, such as a nylon and/or plastic vinyl sheath. For example, in one embodiment, first wire lead 308 may be encapsulated by a corrosion resistant material at first solder joint 312. Likewise, second wire lead 310 may be encapsulated by a corrosion resistant material at second solder joint 314. More particularly, first solder joint 312 may be encapsulated by an overmold 316, as described above, and/or coated with a corrosion resistant material, such as LOCTITE 3554 and/or LOCTITE 3555. Similarly, second solder joint 314 may be encapsulated by an overmold 318, as described above, and/or coated with a corrosion resistant material, such as LOCTITE.

Electromagnetic actuator 302 is electrically connected to a terminal assembly 320, which may function to supply electrical power (e.g., direct electrical current and/or alternating electrical current) to electromagnetic actuator 302. To this end, terminal assembly 320 includes an input terminal 322, a contact member 324, and a flexible sleeve 326 (such as a flexible rubber sleeve) connected over at least a portion of input terminal 322. More particularly, sleeve 326 may couple over input terminal 322, such that input terminal 322 is at least partially sealed against flow of combustible gas 208 within gas flow controller 100. In the example embodiment, input terminal 322 and contact member 324 are a nickel plated, tin matted, brass alloy; however, any other suitable composition of corrosion resistant and/or conductive materials may be used in the fabrication of input terminal 322 and contact member 324.

In the example embodiment, flexible sleeve 326 is a rigid plastic overmolded onto input terminal 322, forming a gas tight seal around input terminal 322, and a material of input terminal 322 is chosen for both conductivity and corrosion resistance. In addition, in some embodiments, input terminal 322 and contact member 324 are a unitary or monolithic, L-shaped, component.

To couple electromagnetic actuator 302 to an electrical power source (not shown), input terminal 322 may be directly connected to the power source (such as via a current carrying wire connected between input terminal 322 and the power source). Power may be transferred from input terminal 322 to contact member 324, and first wire lead 308 electrically connected to contact member 324 to pick up power on contact member 324. In some embodiments, an electrical connection between first wire lead 308 and contact member 324 is encapsulated in a corrosion resistant material, as described above, such as by an overmold and/or a corrosion resistant coating (e.g., LOCTITE 3554 and/or LOCTITE 3555).

Figure 5:
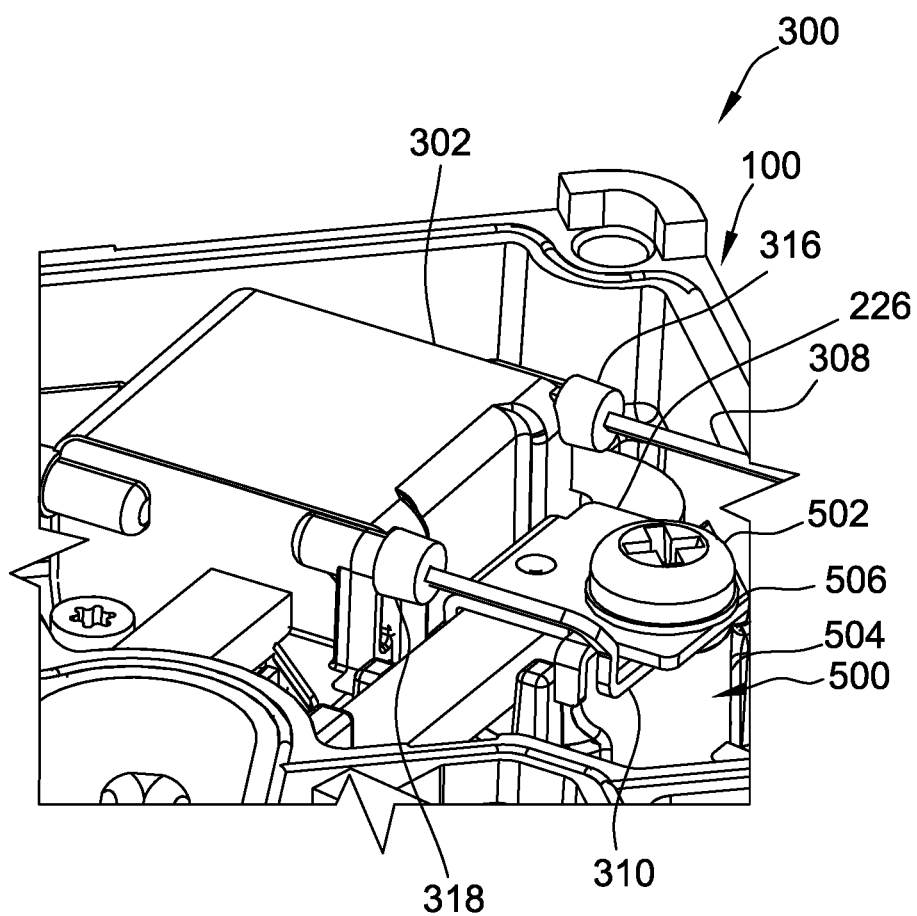
FIG. 5 is a perspective of a portion of the gas flow valve actuator assembly shown in FIG. 3 mounted within the gas flow controller shown in FIG. 2A.

FIG. 5 is a perspective view of a portion of gas flow valve actuator assembly 300 (shown in FIG. 3), in which electromagnetic actuator 302 is mounted within gas flow controller 100 (shown in FIG. 1) and electrically connected to a screw assembly 500. Similarly, FIG. 6 is a cross-sectional view of a portion of screw assembly 500, and FIG. 7 is a top view of screw assembly 500.

Figure 6:
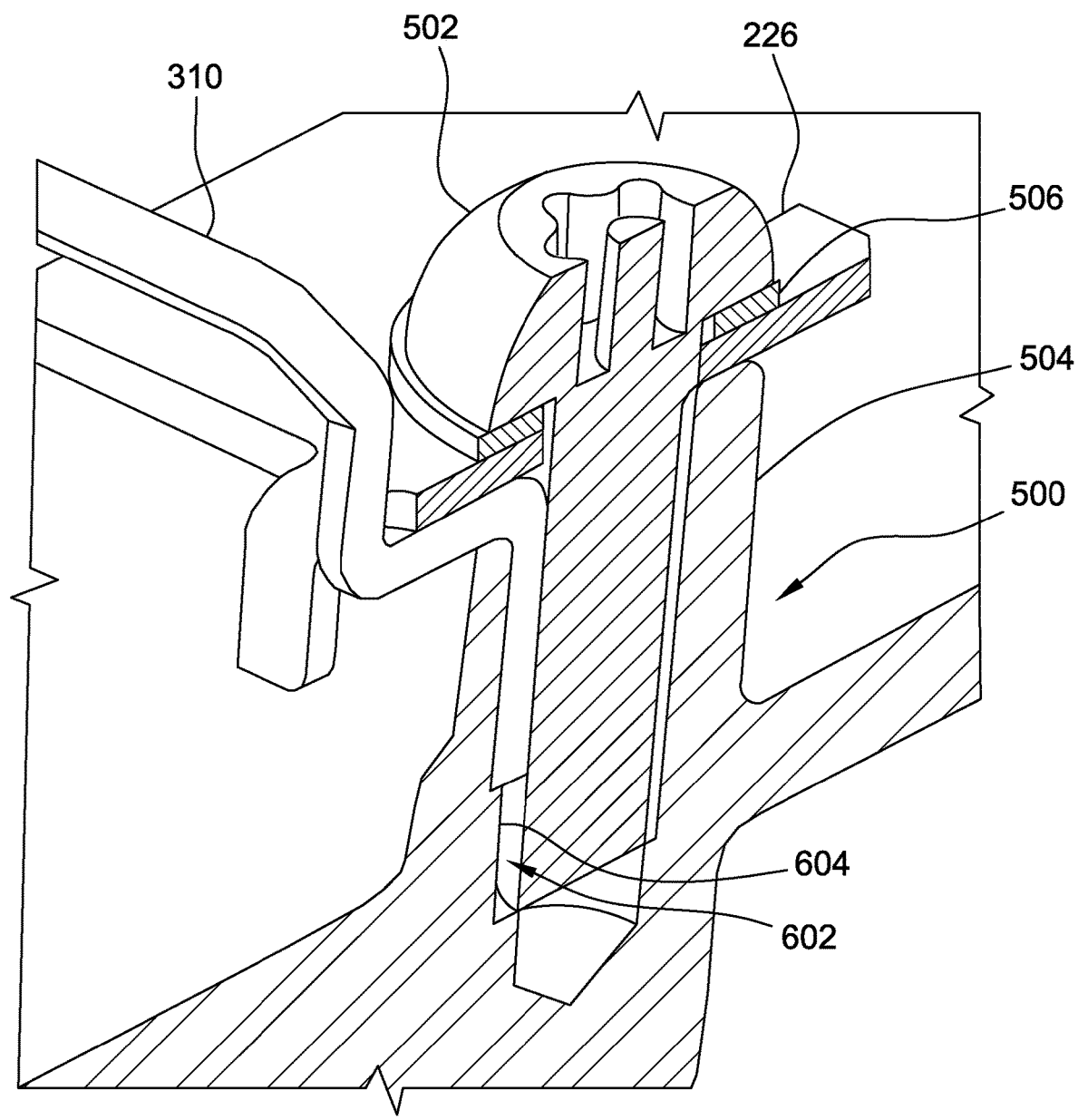
FIG. 6 is a section view of an example grounding screw assembly and a portion of the gas flow valve actuator assembly shown in FIG. 3.
Figure 7:
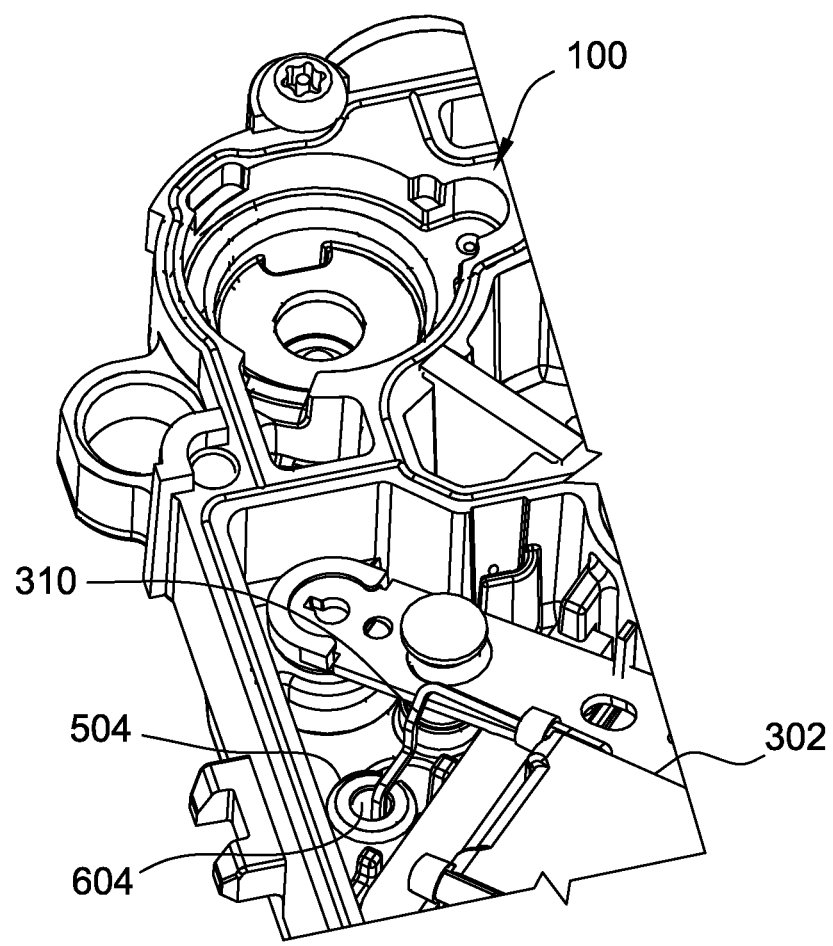
FIG. 7 is a top perspective of a portion of the assembly shown in FIG. 6.

With reference to FIGS. 5, 6, and 7, gas flow controller 100 and/or gas flow valve actuator assembly 300 includes screw assembly 500, which functions to electrically connect or couple gas flow valve actuator assembly 300 to ground (e.g., earth ground). To this end, screw assembly 500 includes a screw 502 and a screw boss 504 (e.g., a terminal block or casting) arranged to receive screw 502. In some embodiments, screw 502 and screw boss 504 are threaded and arranged to threadably engage with each other. In addition, in some embodiments, a washer 506, such as a star washer, is disposed between screw 502 and mounting bracket 226. Washer 506 may scrape or abrade away any oxidation that has formed on screw 504 and/or mounting bracket 226. Washer 506 may also exert tension on screw 502 to prevent or reduce loosening, such as loosening of screw 502 that may otherwise occur over time due to vibration, thermocycles of gas flow controller 100, and the like.

In addition, screw boss 504 includes a receiving channel 602 that extends axially within an interior surface 604 thereof. As described below, receiving channel 602 may be sized and/or shaped to securely receive a ground wire, such as second wire lead 310 of gas flow valve actuator assembly 300. For example, where second wire lead 310 is a square shaped wire, receiving channel 602 may also be square shaped.

In a method of assembly, second wire lead 310 is mechanically and electrically connected within receiving channel 602 between receiving channel 602 and screw 502. For example, second wire lead 310 may be inserted within receiving channel 602 and secured therein by screw 502. As screw 502 is connected within screw boss 504, one or more threads of screw 502 may engage with or penetrate second wire lead 310 to ensure secure electrical contact between second wire lead 310 and screw assembly 500. In addition, any existing oxidation and/or corrosion on second wire lead 310 may be penetrated by screw 502 to further ensure a secure electrical connection is made. Thus, second wire lead 310 may electrically ground gas flow valve actuator assembly 300 through screw assembly 500.

Figure 8A:
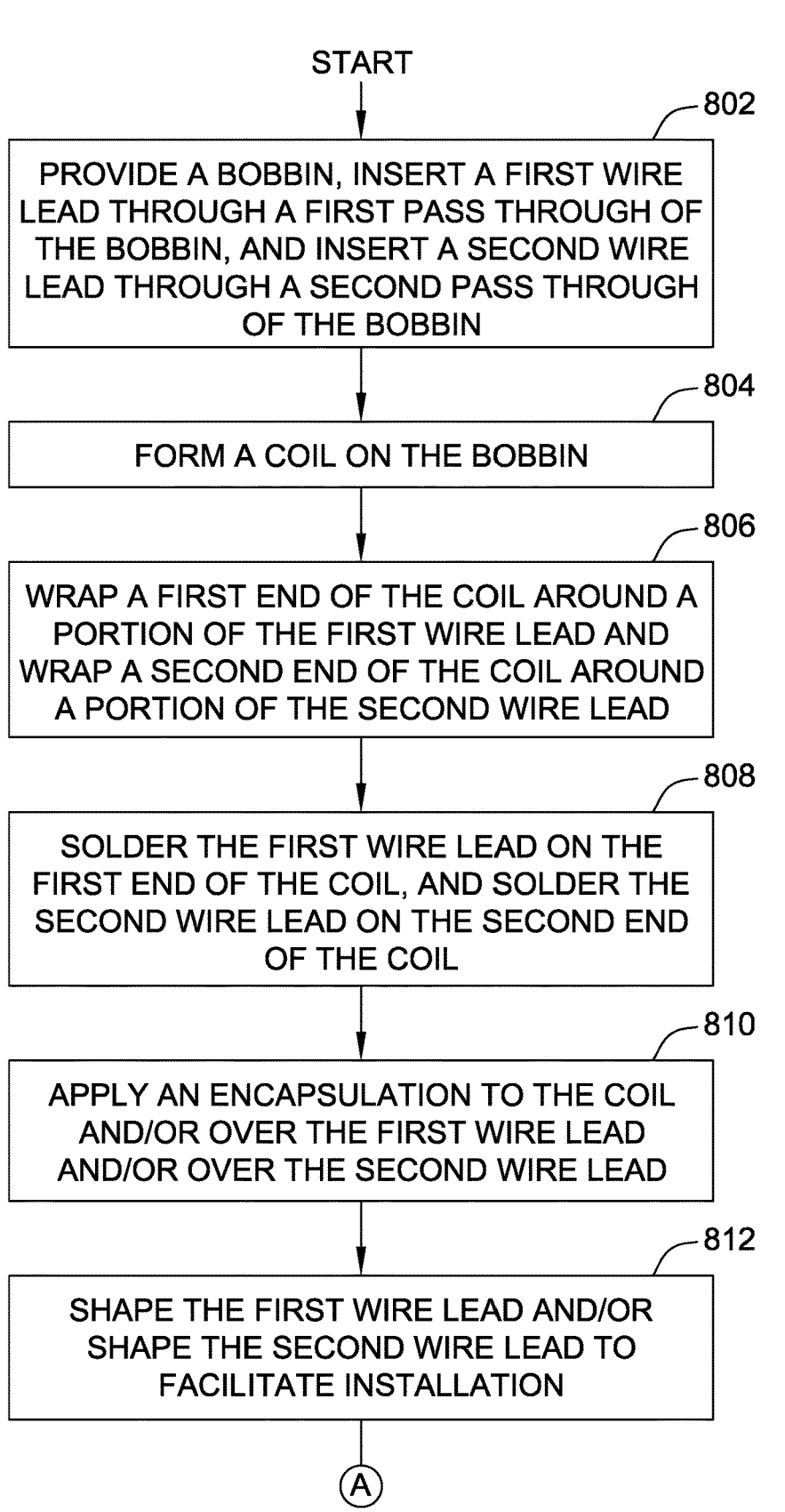
FIGS. 8A and 8B are segments of a flowchart illustrating a process of manufacturing the electromagnetic actuator shown in FIGS. 4A-4C.
Figure 8B:
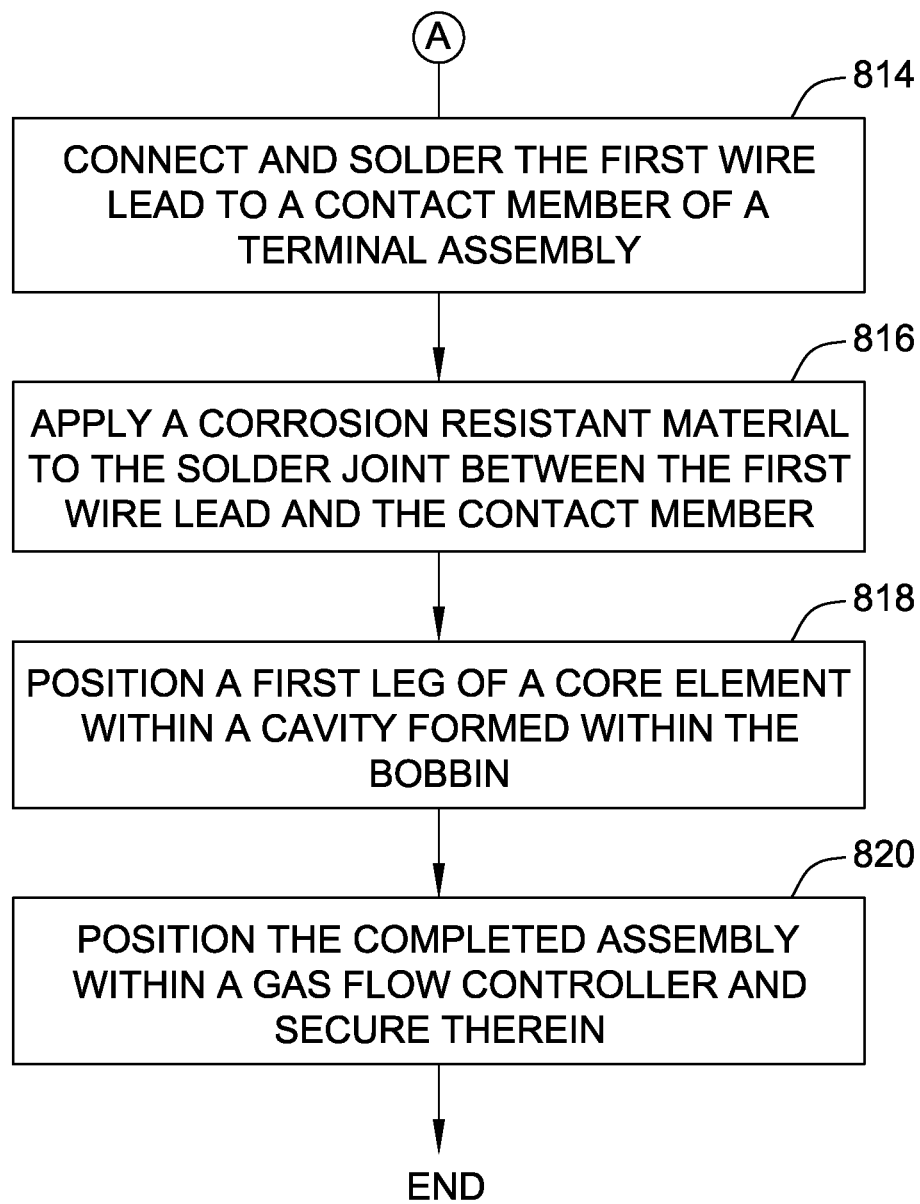

FIGS. 8A and 8B are segments of a flowchart illustrating a method 800 of manufacturing and/or assembling electromagnetic actuator 302 (shown in FIGS. 3 and 4). Accordingly, during manufacture and/or assembly, bobbin 404 is provided, first wire lead 308 is inserted through first pass through 422, and second wire lead 310 is inserted through second pass through 424 (step 802). Next, coil 406 is formed on bobbin 404, such as by winding the length of wire comprising coil 406 about bobbin 404 (step 804). Specifically, the length of wire comprising coil 406 is wound around bobbin 404 a number of times to achieve a desired electromagnetic field and/or total coil resistance during operation. For example, a greater number of windings may be applied to bobbin 404 to achieve a stronger electromagnetic field, while fewer windings may reduce the strength of the electromagnetic field generated by electromagnetic actuator 302.

Similarly, a varying number of windings may be applied to bobbin 404 to adjust a total resistance of coil 406 (and thus a total power utilized and/or dissipated by coil 406). In some embodiments, a total resistance of a coil associated with first electromagnetic actuator 218 is approximately 16.4 Ohms, and a total resistance of a coil associated with second electromagnetic actuator 224 is approximately 9.4 Ohms. However, other resistance values may be implemented to dissipate more or less power in coil 406. Further, the number of windings applied on bobbin 404 may correspond to an electromagnetic field sufficient to pull (or hold) a respective gas flow valve 214 and/or 220 open against a spring or biasing force (as described above).

Once coil 406 is formed on bobbin 404, first end 426 of coil 406 is wrapped around a portion of first wire lead 308 extending through first pass through 422, and second end 428 of coil 406 is wrapped around a portion of second wire lead 310 extending through second pass through 424 (step 806). In addition, first wire lead 308 is soldered on first end 426 of coil 406, and second wire lead 310 is soldered on second end 428 of coil 406 (step 808).

Once coil 406 is formed on bobbin 404, encapsulation 408 is applied to coil 406 as well as, in at least some embodiments, over first wire lead 308 and second wire lead 310 (e.g., over solder joints 312 and 314) (step 810). For example, encapsulation 408 may be bonded over coil 406 between first flange 410 and second flange 412, such that coil 406 is sealed from contact with flow of combustible gas 208. In some cases, encapsulation 408 is a (thermally conducting) overmold that is bonded over coil 406 and secured between flanges 410 and 412. In other embodiments, encapsulation 408 is a corrosion resistant coating, such as a coating of LOCTITE 3554 and/or LOCTITE 3555.

Once coil 406 and/or first wire lead 308 and/or second wire lead 310 are encapsulated and/or coated, first wire lead 308 and/or second wire lead 310 may be shaped (e.g., bent) to facilitate installation of gas flow valve actuator assembly 300 in gas flow controller 100 (step 812). For example, second wire lead 310 may be shaped or bent to facilitate insertion of second wire lead 310 in screw assembly 500 (as described herein). In some embodiments, first wire lead 308 may be connected to contact member 324 of terminal assembly 320 and soldered thereon (step 814). In addition, in some embodiments, a corrosion resistant material may be applied, as described above, to the solder joint between first wire lead 308 and contact member 324 (step 816).

Next, in the example embodiment, first leg 401 of core element 402 is positioned or inserted at least partially within cavity 420 of bobbin 404 (step 818). Core element 402 may also be secured within bobbin 404 to ensure that core element 402 does not shift or alter position during installation and/or operation. For example, in some embodiments, first leg 401 may be loosely positioned in bobbin 404, whereupon a mounting bracket, such as mounting brackets 226 and/or 228, may be utilized to secure first leg 401 within bobbin 404.

Finally, gas flow valve actuator assembly 300 is positioned within gas flow controller 100 and secured therein (step 820). For example, second wire lead 310 is inserted within receiving channel 602 of screw assembly 500 and secured therein by screw 502. Thus, second wire lead 310 is coupled within screw assembly 500 to electrically ground gas flow valve actuator assembly 300 through screw assembly 500. In addition, fastener 234, such as a bolt or screw, is inserted through a mounting bracket, such as first mounting bracket 226 and/or second mounting bracket 228, to secure gas flow valve actuator assembly 300 within gas flow controller 100.

Embodiments of the gas flow controller and gas flow valve actuator assembly described herein achieve superior results as compared to prior art systems. For example, the gas flow actuator assembly described herein includes one or more encapsulated components. These encapsulated components are resistant to corrosion occurring as a result of contact with a flow of combustible gas entrained with various corrosive and/or abrasive contaminants, such as, for example, water, oxygen, hydrogen sulfide, carbon dioxide, various chlorides, microorganisms capable of attaching to the actuator windings, and the like.

The encapsulated components described herein (including, for example, the encapsulated electromagnetic actuator) are shielded from contact with a flow of combustible gas that may be entrained with a variety of corrosive substances. These substances may occur within the flow of combustible gas as a result of hydrogeological fracturing (or "fracking") mining processes, such as deep injection well stimulation mining processes. Combustible gas obtained from such processes (e.g., "fracked gas") may be laden with a variety of corrosive substances, at least some of which many common gas flow controllers are not equipped to withstand. Thus, the encapsulated components described herein are protected, such as by one or more overmolds and/or coatings, to tolerate prolonged exposure to the corrosive substances entrained in combustible gasses obtained by such mining techniques.

Gas flow controllers of this disclosure may include a corrosion resistant material, such as an encapsulation, overmold or coating, disposed over a coil and/or one or more wire leads of a gas flow actuator assembly, such as over one or more soldering joints of the gas flow actuator assembly. In some cases, the overmold or coating is thermally conductive and configured to radiate excess thermal energy generated by an encapsulated component, such that the encapsulated component is protected from thermal wear and/or damage.

Moreover, gas flow controllers may include a corrosion resistant overmold or coating disposed over an electrical contact formed between a contact member of a terminal assembly and a lead wire of a gas flow actuator assembly. Further, another lead wire (e.g., a ground wire) of the gas flow actuator assembly may be connected within a secure receiving channel of a screw assembly arranged to couple the gas flow actuator assembly to ground as well as to shield at least a portion of the lead wire from exposure to one or more corrosive substances within a flow of fracked gas.

The gas flow controller may be constructed and manufactured from relatively inexpensive materials and be substantially more cost efficient to produce than many known gas flow controllers, many of which may incorporate expensive, custom manufactured, components and materials. The methods of assembly described are more cost effective, and produce a more reliable system.

In prior art valves, the coil was powered directly by the thermocouple. Although the voltage was low, e.g., 760 millivolts, there was sufficient amperage to power the redundant (safety) valve. This valve was opened manually, and then held open by the power from the thermocouple. The wire used was relatively large so that sufficient amp turns were generated such that the valve would be held open. In addition, the spring used to close the valve was much more robust, and therefore more expensive than the embodiments described above. Because of the limited power available for this control, the valves and the valve actuators have been moved inside the body of the gas valve, and the spring rates and distances the valves move in opening and closing are much less than previous designs. As a result, power management and preservation are improved.

In addition, another reason to encapsulate is that an effect of hydrogen sulfide corrosion is that it converts copper to an oxide, which effectively reduces the cross-sectional area of the wire and thereby reduces the amount of current which can flow. Since embodiments of the system disclosed are power constrained or power conserving, preservation of the wire from oxidation by encapsulation is advantageous.

Example embodiments of a gas flow actuator assembly for use in a gas flow controller of a gas powered water heater are described above in detail. The gas flow actuator assembly is not limited to the specific embodiments described, but rather, components of the gas flow actuator assembly may be used independently and separately from other components described. For example, the gas flow actuator assembly described may be used in a variety of fluid transport systems including, for example, and without limitation, various gas powered water heater systems, gas heating and gas furnace systems, refrigeration systems, pumping systems, air conditioning systems, and/or other systems utilizing a combustible (and/or contaminated) flow of gas.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained, in the above description and shown in the accompanying drawing(s) shall be interpreted as illustrative and not in a limiting sense.

What is claimed is:

1. A gas powered water heater comprising:
   a first gas flow valve;
   a pilot burner arranged to receive a flow of combustible gas from the first gas flow valve;
   a first gas flow valve actuator assembly connected to the first gas flow valve and configured to hold the first gas flow valve in an open position upon completion of an ignition sequence, the first gas flow valve actuator assembly including:
      a first electromagnetic actuator encapsulated by a corrosion resistant material;
      a first wire lead electrically connected to the first electromagnetic actuator and encapsulated by a corrosion resistant material; and
      a second wire lead electrically connected to the first electromagnetic actuator and encapsulated by a corrosion resistant material;
   a second gas flow valve;
   a main burner arranged to receive a flow of combustible gas from the second gas flow valve; and
   a second gas flow valve actuator assembly connected to the second gas flow valve and configured to open and close the second gas flow valve in response to a call for heat, the second gas flow valve actuator assembly including:
      a second electromagnetic actuator encapsulated by a corrosion resistant material;
      a first wire lead electrically connected to the second electromagnetic actuator and encapsulated by a corrosion resistant material; and
      a second wire lead electrically connected to the second electromagnetic actuator and encapsulated by a corrosion resistant material.

2. The gas powered water heater of claim 1, wherein the first gas flow valve actuator assembly further comprises a first terminal assembly configured to supply power to the first electromagnetic actuator, the first terminal assembly comprising:
   an input terminal arranged to receive an electrical current; and
   an overmolded sleeve connected over the input terminal and to protect the input terminal from corrosion.

3. The gas powered water heater of claim 1, wherein the second gas flow valve actuator assembly further comprises a second terminal assembly configured to supply power to the second electromagnetic actuator, the second terminal assembly comprising:

an input terminal arranged to receive an electrical current; and an overmolded sleeve connected over the input terminal and to protect the input terminal from corrosion.

4. The gas powered water heater of claim 1, wherein the first gas flow valve actuator assembly further comprises:

a screw; and a screw boss comprising a receiving channel formed on an interior surface of the screw boss, the screw boss arranged to clamp the second wire lead electrically connected to the first electromagnetic actuator within the receiving channel between the screw and the receiving channel.

5. The gas powered water heater of claim 1, wherein the second gas flow valve actuator assembly further comprises:

a screw; and a screw boss comprising a receiving channel formed on an interior surface of the screw boss, the screw boss arranged to clamp the second wire lead electrically connected to the second electromagnetic actuator within the receiving channel between the screw and the receiving channel.

6. The gas powered water heater of claim 1, wherein the corrosion resistant material encapsulating the first electromagnetic actuator comprises an overmold bonded over the first electromagnetic actuator, and wherein the corrosion resistant material encapsulating the second electromagnetic actuator comprises an overmold bonded over the second electromagnetic actuator.

7. A gas flow controller for use with a gas powered water heater, the gas flow controller comprising:

a first gas flow valve; and a first gas flow valve actuator assembly mechanically connected to the first gas flow valve and configured to hold the first gas flow valve in an open position, the first gas flow valve actuator assembly comprising:

a first electromagnetic actuator;

a corrosion resistant material encapsulating the first electromagnetic actuator;

a first wire lead electrically connected to the first electromagnetic actuator at a first solder joint;

a corrosion resistant material encapsulating the first solder joint;

a second wire lead electrically connected to the first electromagnetic actuator at a second solder joint;

a corrosion resistant material encapsulating the second solder joint;

a screw; and a screw boss comprising a receiving channel formed on an interior surface of the screw boss, the screw boss arranged to clamp the second wire lead within the receiving channel between the screw and the receiving channel.

8. The gas flow controller of claim 7, further comprising:

a second gas flow valve; and a second gas flow valve actuator assembly mechanically connected to the second gas flow valve and configured to open and close the second gas flow valve, the second gas flow valve actuator assembly comprising:

a second electromagnetic actuator;

a corrosion resistant material encapsulating the second electromagnetic actuator;

a first wire lead electrically connected to the second electromagnetic actuator at a first solder joint;

a corrosion resistant material encapsulating the first solder joint;

a second wire lead electrically connected to the second electromagnetic actuator at a second solder joint; and a corrosion resistant material encapsulating the second solder joint.

9. The gas flow controller of claim 7, further comprising a terminal assembly electrically connected to the first wire lead, the terminal assembly configured to supply power to the first electromagnetic actuator, the terminal assembly comprising:

an input terminal arranged to receive an electrical current; and an overmolded sleeve connected over the input terminal and arranged to protect the input terminal from corrosion.

10. The gas flow controller of claim 7, wherein the corrosion resistant material encapsulating the first electromagnetic actuator comprises an overmold bonded over the first electromagnetic actuator.

11. The gas flow controller of claim 7, wherein the corrosion resistant material encapsulating the first solder joint comprises an overmold bonded over the first solder joint, and wherein the corrosion resistant material encapsulating the second solder joint comprises an overmold bonded over the second solder joint.

12. The gas flow controller of claim 7, wherein the corrosion resistant material encapsulating the first solder joint comprises a corrosion resistant coating, and wherein the corrosion resistant material encapsulating the second solder joint comprises a corrosion resistant coating.

13. A gas flow valve actuator assembly for use with a gas powered water heater, the gas flow valve actuator assembly comprising:

an electromagnetic actuator;

a corrosion resistant material encapsulating at least a portion of the electromagnetic actuator;

a first wire lead electrically connected to the electromagnetic actuator at a first solder joint;

a corrosion resistant material encapsulating at least a portion of the first solder joint;

a second wire lead electrically connected to the electromagnetic actuator at a second solder joint; and a corrosion resistant material encapsulating at least a portion of the second solder joint;

a screw; and a screw boss comprising a receiving channel formed on an interior surface of the screw boss, the screw boss arranged to clamp the second wire lead within the receiving channel between the screw and the receiving channel.

14. The gas flow valve actuator assembly of claim 13, further comprising a terminal assembly electrically connected to the first wire lead, the terminal assembly configured to supply power to the electromagnetic actuator, the terminal assembly comprising:

an input terminal arranged to receive an electrical current; and an overmolded sleeve connected over the input terminal and arranged to protect the input terminal from corrosion.

15. The gas flow valve actuator assembly of claim 13, wherein the corrosion resistant material encapsulating the electromagnetic actuator comprises an overmold bonded over the electromagnetic actuator.

16. The gas flow valve actuator assembly of claim 13, wherein the corrosion resistant material encapsulating the first solder joint comprises an overmold bonded over the first solder joint, and wherein the corrosion resistant material encapsulating the second solder joint comprises an overmold bonded over the second solder joint.

17. The gas flow valve actuator assembly of claim 13, wherein the corrosion resistant material encapsulating the first solder joint comprises a corrosion resistant coating, and wherein the corrosion resistant material encapsulating the second solder joint comprises a corrosion resistant coating.

18. The gas flow valve actuator assembly of claim 17, wherein the corrosion resistant coating encapsulating the first and second solder joints is one of LOCTITE 3554 and LOCTITE 3555.

* * * * *